No. 810,981. PATENTED JAN. 30, 1906.
B. L. RINEHART.
SOUND BOX FOR TALKING MACHINES.
APPLICATION FILED JULY 25, 1903.

WITNESSES:
F. J. Hartman
Edw. W. Vaill Jr.

INVENTOR
Bentley L. Rinehart
BY
Horace Pettit
ATTORNEY.

UNITED STATES PATENT OFFICE.

BENTLEY L. RINEHART, OF CAMDEN, NEW JERSEY, ASSIGNOR TO VICTOR TALKING MACHINE COMPANY, A CORPORATION OF NEW JERSEY.

SOUND-BOX FOR TALKING-MACHINES.

No. 810,981.          Specification of Letters Patent.          Patented Jan. 30, 1906.

Application filed July 25, 1903. Serial No. 166,942.

*To all whom it may concern:*

Be it known that I, BENTLEY L. RINEHART, a citizen of the United States, and a resident of Camden, State of New Jersey, have invented certain new and useful Improvements in Sound-Boxes for Talking-Machines, of which the following is a full, clear, and complete disclosure.

My invention relates to sound-boxes for talking-machines, and particularly to that part of the same which is known as the "stylus-bar," and comprises means for mounting the same upon the sound-box, whereby the same is more efficiently held in position, while at the same time greater freedom of movement is allowed to the action of the stylus-bar and stylus in connection with the talking-machine record.

For a full, clear, and exact description of my invention reference may be had to the following specification, and to the accompanying drawings, forming a part thereof, in which—

Figure 1:
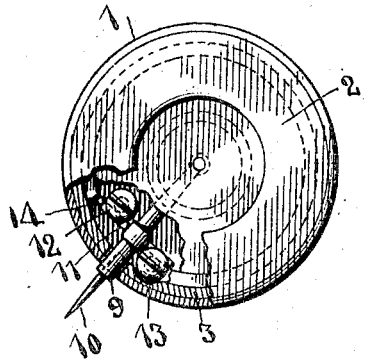
Figure 2:
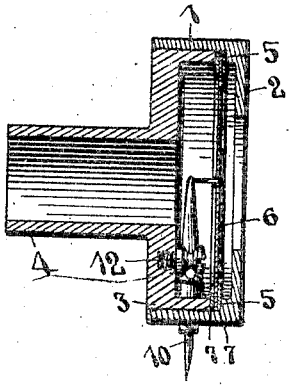
Figure 3:
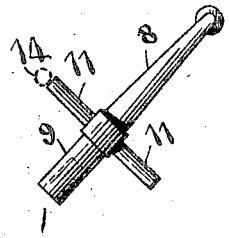

Figure 1 shows a side elevation of a sound-box with the supporting portion thereof and the diaphragm removed; Fig. 2, a vertical longitudinal section of a complete sound-box; Fig. 3, a view showing the stylus-bar detached from the sound-box, and Fig. 4 a view showing a modified form of my invention.

In the drawings the numeral 1 indicates the cylindrical casing of the sound-box proper, and 2 its end plate.

3 indicates a cylindrical portion upon which the cylindrical portion 1 is driven and which carries the tubular portion 4, which is connected with the amplifying-horn or other sound-conveying device.

5 indicates a flange which is adapted, in connection with the end of the tubular portion 3, to hold the diaphragm 6 in position, elastic washers 7 being inserted between the diaphragm and the retaining parts to give yielding support.

The stylus-bar comprises a tapering portion 8 and an end portion 9, which has a socket therein to receive the stylus or needle 10. This stylus may be held within the socket in any suitable manner, such as by a set-screw or by the use of magnetism, such as I have described in my former application, Serial No. 147,763, filed March 14, 1903. Adjacent the end portion 9 of the stylus-bar are provided trunnions or studs 11, which are adapted to have bearings in the grooved screws 12 and 13, carried by the sound-box casing. The screw 13 is adapted to bear upon the lower side of one trunnion 11, while the screw 12 is adapted to bear upon the upper side of the opposite trunnion. The grooves in these screws preferably have inclined or V-shaped walls, as indicated clearly in Figs. 2 and 4, and the trunnions are adapted to bear upon the tapering sides thereof and do not come in contact with the bottom of the grooves. A pin 14 is provided which is adapted to contact with the upper end of the upper trunnion 11, so that the trunnions may be kept in position longitudinally upon the screws 12 and 13. The end portion 9 of the stylus-bar projects through the usual opening 15 in the sound-box casing. The upper or smaller end of the stylus-bar is connected to the diaphragm 6 in the usual manner by the small wire 16.

Figure 4:
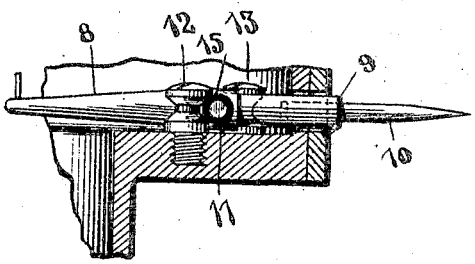

In Fig. 4 I have shown a modified form, in which the trunnions 11 are covered with sleeves 15, of rubber or felt or similar yielding or elastic material, which forms a cushion between said trunnions and their bearing-screws 12 and 13, so that harsh and disagreeable sounds which might be transmitted by the stylus-bar to the sound-box casing are obviated, and the tone of the sound produced by the sound-box is thereby improved.

It will be seen that by the construction above described the stylus-bar is held loosely in position when the sound-box is not in use; but when the needle is brought upon the sound-record so as to be inclined thereto at the usual angle there is a tendency to rotate the stylus-bar about a horizontal axis, so that one of the trunnions is forced downwardly into the groove of the screw 15, while the opposite trunnion is forced upwardly into the groove of the screw 12. This position of the stylus-bar also results in a tendency of the trunnions to move longitudinally in an upward direction; but said movement is prevented and the stylus-bar is held in the requisite transverse position by means of the pin 14, which forms a thrust-bearing. In these forms of construction many advantageous results are produced, among which may be mentioned great freedom of movement of the stylus-bar and the fact that in constructing a large number of sound-boxes the bearings or screws when once placed in position will always have the same amount of friction and other effects upon the stylus-bar which will cause all of the sound-boxes so manufactured to have the same degrees of quality of tone and uniformity of action without the employment of delicate adjusting means, which are liable to become displaced after continuous use. These constructions also do away with the use of springs or other resilient mountings, which vary in their quality, resiliency, and durability in different sound-boxes and at different times in the same sound-box.

I do not wish to be limited to the exact form or position of the parts herein set forth, for the same may be varied without departing from the spirit and scope of my invention; but

What I claim, and desire to protect by Letters Patent of the United States, is—

1. In a sound-box for talking-machines, a stylus-bar and means for positioning said stylus-bar upon said sound-box so as to allow oscillation thereof, said means being made operative solely by the downward pressure upon the record, caused by the weight of the sound-box and parts carried thereby.

2. In a sound-box for talking-machines, a stylus-bar, and pivot-bearings having parts located respectively upon the stylus-bar and sound-box casing and being held in operative contact solely by the downward pressure upon the record caused by the weight of the sound-box and parts carried thereby.

3. In a sound-box for talking-machines, a stylus-bar and a pivot-bearing therefor, comprising parts located respectively upon the stylus-bar and sound-box casing and having a grooved bearing and coacting pivot, said pivot being held operatively against said bearing solely by the downward pressure upon the record caused by the weight of the sound-box and parts carried thereby.

4. In a sound-box for talking-machines, a stylus-bar, pivot-bearings therefor, comprising grooved parts opening in opposite directions and studs coöperating with said parts and held operatively within said grooves solely by the downward pressure upon the record caused by the weight of the sound-box and parts carried thereby.

5. In a sound-box for talking-machines, a stylus-bar, a fulcrum therefor comprising grooved parts opening in opposite directions and trunnions coöperating therewith and held operatively within said grooves by the downward pressure upon the sound-record caused by the weight of the sound-box and parts carried thereby.

6. In a sound-box for talking-machines, a stylus-bar, a fulcrum therefor comprising parts having V-shaped grooves opening in opposite directions and trunnions coöperating therewith and held operatively within said grooves by the downward pressure upon the record caused by the weight of the sound-box and parts carried thereby.

7. In a sound-box for talking-machines, a stylus-bar, having trunnions, a fulcrum therefor comprising grooved screws adapted to receive said trunnions and to bear upon the same upon opposite sides of the axis thereof, said trunnions being retained in the grooves by the downward pressure upon the record caused by the weight of the sound-box and parts carried thereby.

8. In a sound-box for talking-machines, a stylus-bar, trunnions carried thereby, grooved screws carried by the sound-box casing, said grooves having V-shaped sides adapted to contact with said trunnions, to hold the stylus-bar in position by the downward pressure upon the sound-record caused by the weight of the sound-box and parts carried thereby and means for locating said trunnions longitudinally.

9. In a sound-box for talking-machines, a stylus-bar, trunnions carried thereby, screws carried by the sound-box casing having V-shaped grooves therein to receive said trunnions, said screws being arranged upon opposite sides of the normal axis of said trunnions so that the stylus-bar is held in position by the downward pressure upon the sound-record, caused by the weight of the sound-box and parts carried thereby.

10. In a sound-box for talking-machines, a stylus-bar, a fulcrum therefor, and yielding material interposed between said fulcrum and its bearing.

11. In a sound-box for talking-machines, a stylus-bar, a fulcrum therefor and a cushioned bearing for said fulcrum.

12. In a sound-box for talking-machines, a stylus-bar, a fulcrum therefor, a bearing for said fulcrum and a cushion of yielding material interposed between said fulcrum and said bearing.

13. In a sound-box for talking-machines, a stylus-bar, trunnions carried thereby, bearings carried by the sound-box casing and having recesses therein to receive said trunnions, and sleeves of yielding material covering said trunnions.

14. In a sound-box for talking-machines, a stylus-bar, trunnions carried thereby, bearings carried by the sound-box casing and having V-shaped grooves therein to receive said trunnions, and sleeves of yielding material covering said trunnions, said trunnions being held in said grooves by the downward pressure upon the record caused by the weight of the sound-box and attached parts.

15. In a sound-box for talking-machines, a stylus-bar and bearings therefor, the parts of said bearings being normally out of operative engagement and held in operative engagement by the contact of the stylus with the record.

In witness whereof I have hereunto set my hand this 20th day of July, A. D. 1903.

BENTLEY L. RINEHART.

Witnesses:
Lewis H. Van Dusen,
Edw. W. Vaill, Jr.